April 7, 1925.
H. M. KORETZKY ET AL
1,533,012
DRY CELL BATTERY
Filed Dec. 17, 1919   2 Sheets-Sheet 1
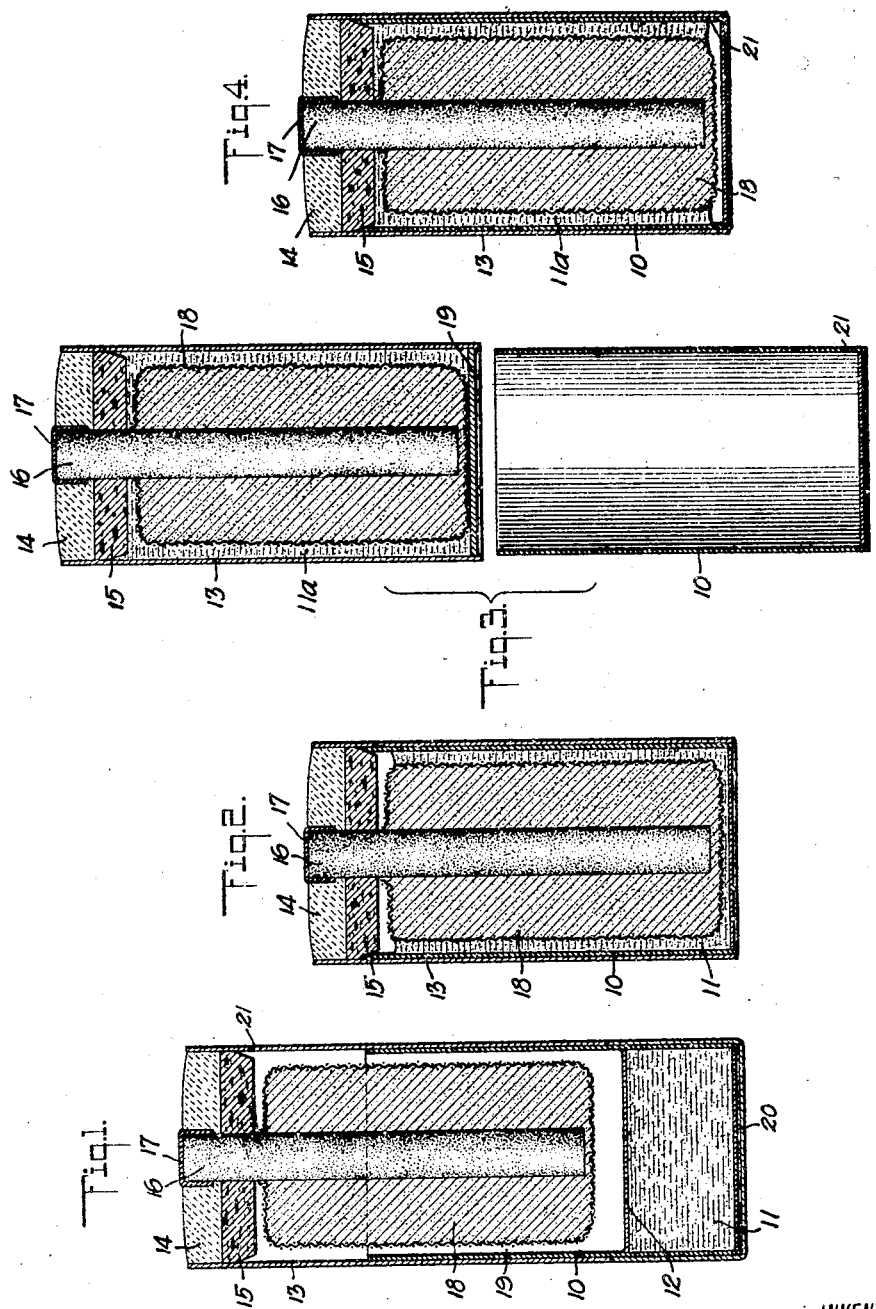
WITNESSES
INVENTORS
HARRY M. KORETZKY
BORIS H. TEITELBAUM
BY
ATTORNEYS April 7, 1925. 1,533,012
H. M. KORETZKY ET AL
DRY CELL BATTERY
Filed Dec. 17, 1919 2 Sheets-Sheet 2
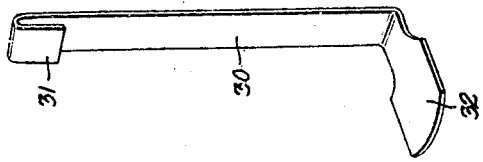
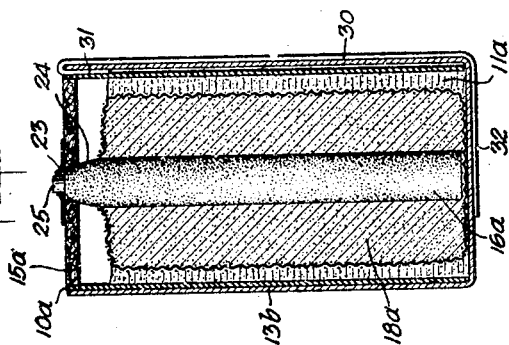
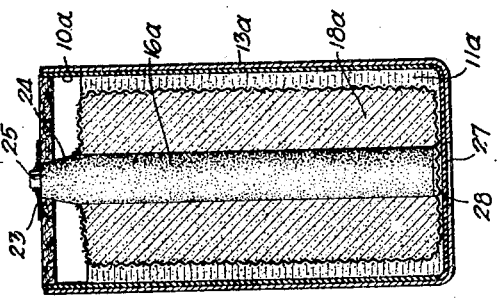
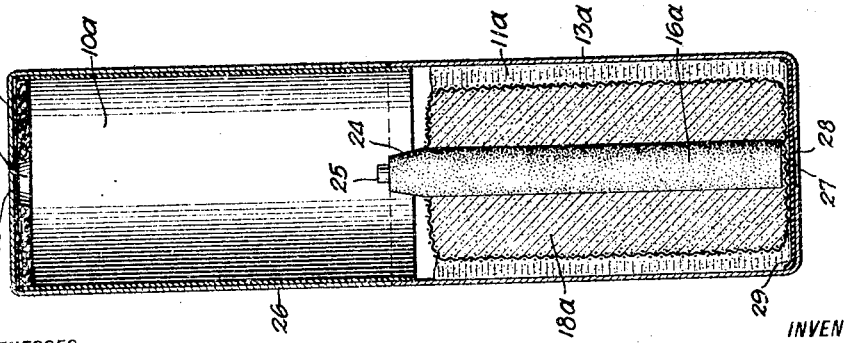
WITNESSES
INVENTORS
HARRY M. KORETZKY.
BORIS H. TEITELBAUM.
BY
ATTORNEYS Patented Apr. 7, 1925.

1,533,012

UNITED STATES PATENT OFFICE.

HARRY M. KORETZKY AND BORIS H. TEITELBAUM, OF BROOKLYN, NEW YORK; SAID TEITELBAUM ASSIGNOR TO SAID HARRY M. KORETZKY AND ISRAEL KORETZKY, OF NEW YORK, N. Y.

DRY-CELL BATTERY.

Application filed December 17, 1919. Serial No. 345,643.

*To all whom it may concern:*

Be it known that we, HARRY M. KORETZKY and BORIS H. TEITELBAUM, citizens of the United States, and residents of the city of New York, borough of Brooklyn, in the county of Kings and State of New York, have invented a new and Improved Dry-Cell Battery, of which the following is a full, clear, and exact description.

This invention relates to dry cell batteries and has particular reference to such devices as are commonly used in connection with flashlights or analogous devices, and especially such as are claimed broadly in our co-pending application Serial No. 345,642, filed even date herewith.

Among the special objects of this invention is to provide two relatively movable or telescopic containers for the positive and negative elements of the battery and with peculiar means for sealing the structure to prevent leakage of the electrolyte after the parts are telescoped into active position.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a vertical longitudinal section of one form of our improvement in idle position.

Fig. 2 is a similar view with the parts fully telescoped for action.

Fig. 3 is a vertical sectional view of a modification.

Fig. 4 is a similar view of the same parts assembled for action.

Fig. 5 is a vertical sectional view of another modification prior to operation.

Fig. 6 is a sectional view of the same assembled for action.

Fig. 7 is a view similar to Fig. 6 with a slight further modification.

Fig. 8 is a detail perspective view of the contact strip.

Referring now more particularly to Figs. 1 and 2 we show a container 10 of metal such as zinc and having supplied in the bottom thereof a mass of electrolyte 11 of a jelly-like consistency, the same being held in the form shown and from evaporation or deterioration by means of a washer 12 of paraffined paper or other moisture-proof but frangible material.

The other telescopic member consists of a tubular device or container 13 into which the container 10 is slidably fitted and held normally in partial telescoped position. The inner end of the container 13 is open except for the location therein of the container 10, and the outer end of the member 13 is closed by means of a bituminous seal 14 adjacent to the inner surface of which is fitted a closure member 15 in the nature of cork or the like adapted to be projected into the open upper end of the container 10 when the members are fully telescoped and whereby the electrolyte will be positively held from leakage.

16 indicates a carbon stick in the central portion of the member 13 and held firmly in position by the seal 14 while the outer end of the stick is fitted with a contact cap 17. 18 indicates a depolarizing member carried by the carbon stick 16 within the container 13 and spaced from the walls of the container 13 far enough for a space 19 to be observed within the container 10 at all times, but which space is filled by the electrolyte when the device is fully telescoped.

When the battery is in storage or transportation, preliminary to the time for it to be put into active use, there is no chemical action or deterioration of the elements possible, but when the battery is to be used the operator has simply but to force the parts fully into telescoped position as in Fig. 2 at which time the action between the positive and negative elements takes place metallic contact may be established between the contact piece 17 of one cell and the bottom of the metallic container 10 of another cell arranged in series therewith.

In Figs. 3 and 4 we show another form of the same invention in which the container 13, with respect to the seal 14, closure 15 and elements 16, 17 and 18, is or may be substantially the same as that form of our invention shown in Figs. 1 and 2. The electrolyte 11$^a$, in this form of the invention is filled into the space between the depolarizing member and the wall 13. A cover or plug 19 is fitted into the otherwise open end of the container 13 and serves to receive the electrolyte while filling the container and to prevent drying during the period of inactivity of the battery. This cover or plug 19 may be of paper or any other suitable cheap construction and which may be easily removed from the place indicated in Fig. 3 when the battery parts are to be telescoped for action.

Co-operating with this member 13 as just described is a zinc cup 10 which is adapted to be telescoped within the container 13, after removing the plug 19 as stated above, the open upper end of the cup 10 being adapted to receive the tapered closure cork 15 as shown in Fig. 4 and similar to the action described in connection with Figs. 1 and 2. In the absence of the zinc cup 10 while it is carried separate during the storage or transportation periods, from the container 13, the chemical action between the electrolyte and the depolarizing member is of a negligible degree.

In order to hold the two containers or cups from permature complete telescoping we may employ a cap 20 or tube shown in Fig. 1 as slipped upon the lower end of the member 10 abutting directly against the lower end of the member 13. This cap 20 constitutes additional sealing means and thus makes it practically impossible for the parts to be accidentally shoved one within the other during packing or transportation. The cap 20 may be of paper or some other cheap discardable material. A pinhole 21 may be formed if desired near the cork 15 to permit the air to escape when the parts are telescoped. Said hole will be sealed by the upper edge of the zinc container when the parts are assembled. The bottom portion of the cup 10 may be formed with a similar hole in the form shown in Figs. 3 and 4 for a like purpose. This hole will be sealed by the paper container when the battery is in use.

In Figs. 5 and 6 the zinc member 10$^a$ is made with both ends open, but the upper or outer end thereof is closed by means of a cork 15$^a$ or similar sealing member having a central tapered hole 22 over which is pasted a paper seal 23. The depolarizing member 18$^a$, in which is embedded the carbon stick 16$^a$ is secured in or against the bottom of the paper container 13$^a$ and around this depolarizing member is filled the electrolyte 11$^a$. The upper end of the stick 16$^a$ is tapered at 24 so as to fit snugly into the hole 22 of the cork 15$^a$ after the metallic contact point 25 has punctured the seal 23 as a result of the telescoping of the parts. The zinc member 10$^a$ being normally or preliminarily out of contact with either of the electrical agents no action of such agents takes place prior to the intended telescoping of the parts. Premature telescoping is prevented by a member or some discardable external means such as a paper cap 26. This cap 26 constitutes auxiliary sealing means and protects the seal 23 as well as preventing premature telescoping of the parts. The paper member 13$^a$ has a hole 27 at the lower end which is covered by a zinc plate 28 having an upwardly directed margin 29 to insure direct contact with the lower edge of the zinc cup 10$^a$ when the parts are telescoped. The hole 27 insures contact between said plate 28 and the contact point 25 of the next adjacent cell arranged in series.

In Fig. 7 the paper cup 13$^b$ has a closed bottom and the series contact in adjacent cells is made by means of a metallic contact strip 30 having at its upper end a hook 31 engageable over the upper edge of one cup to engage with the other, and having at it slower end a contact plate 32 resting against the bottom of the cup 13$^b$ in position to be engaged by the contact point 25 of the next cell. Otherwise the features are substantially the same as shown in Figs. 5 and 6. These various forms of cells are interchangeable and hence a multiple cell battery may be produced from any number of these cells of whatever type.

It will be observed that the form of the invention shown on the first sheet of drawings is one in which the zinc member is materially shorter than the fibrous member and consequently in practice of the invention an important economy in metal is enjoyed in the making of the cups 10 in the short form. The several parts of each battery instead of being partially telescoped for packing, shipping, or storage purposes, may be kept as entirely separated units and treated as such. The units being made uniformly and interchangeable may be assembled at any time when a battery is to be put in use. Since the batteries are made to fit standard receptacles space may be conserved by making the outer containers 13$^b$ so as to inclose the contact strip 30 within the outer surface thereof, although for practical purposes the strip may be either inside or outside of such surface.

Referring again to the construction of Figs. 1 and 2 it will be noted that the sealing means includes a bituminous member 14 which ordinarily is inserted hot and so serves to fuse itself rigidly against or into the fiber of the surrounding fibrous member 13, and the other portion of the sealing means is a cork or the like having engagement with both the zinc cup 10 and said fibrous member 13. In this situation the sealing means 15 serves not only to help hold the zinc cup in place as in Fig. 2 but also to prevent the hot sealing member from coming into contact with the depolarizing member 18 and injuring it.

We claim:

1. In a dry cell battery, the combination of two open ended containers adapted to be telescoped one within the other, one of the containers being of metal and the other of fibrous material, one end portion of one of the members comprising a tapered closure member adapted to be received in an opening of the other container when in telescoped position, and an electrolyte carried normally in one of the containers in spaced relation to the other container, said electrolyte being held from leakage from the telescoped containers by said closure member after the battery has been telescoped for use.

2. In a dry cell battery, a fibrous container having closure means at one end comprising a tapered cork, a metallic cup telescopic within the first mentioned container and adapted to receive at its otherwise open end said cork as a closure, a depolarizing member carried by one of the containers and spaced from the walls thereof, and an electrolyte adapted to fill the space between the depolarizing member and said walls and held in place from leakage when the battery is in use.

3. In a dry cell battery, the combination of two containers, one of which is of paper, a depolarizing member carried within this member and spaced from the wall thereof, the other container being of metal and adapted to telescope the first mentioned member and designed to be carried in idle position partially telescoped, a mass of electrolyte carried by the second mentioned member in spaced relation to the depolarizing member, the depolarizing member and electrolyte being adapted to be brought into active connection when telescoped, and means to make electrical contact between the depolarizing member and the adjacent end of the adjacent cell when arranged in series.

4. In a dry cell battery, the combination of a paper container, a carbon stick sealed in one end of the container, a tapered cork fitted within the container adjacent to the sealing member, a depolarizing member carried by the stick within the container and spaced from the wall thereof, a zinc container adapted to telescope with the paper container, and a mass of electrolyte carried in the zinc container out of contact with the depolarizing member prior to the telescoping of the parts, the otherwise open end of the zinc container being adapted to receive the tapered cork to constitute a complete seal when the parts are telescoped.

HARRY M. KORETZKY.
BORIS H. TEITELBAUM.